United States Patent
Becher et al.

(10) Patent No.: US 8,511,151 B2
(45) Date of Patent: Aug. 20, 2013

(54) PRESSURE SENSOR WITH SEMICONDUCTOR PRESSURE MEASURING TRANSDUCER

(75) Inventors: Raimund Becher, Ehrenkirchen (DE); Ralf Nurnberger, Potsdam (DE); Fred Haker, Kleinmachnow (DE); Olaf Krusemark, Kassel (DE); Olaf Textor, Lorrach, TX (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 154 days.

(21) Appl. No.: 13/203,002

(22) PCT Filed: Feb. 2, 2010

(86) PCT No.: PCT/EP2010/051242
§ 371 (c)(1),
(2), (4) Date: Aug. 24, 2011

(87) PCT Pub. No.: WO2010/097272
PCT Pub. Date: Sep. 2, 2010

(65) Prior Publication Data
US 2011/0303023 A1    Dec. 15, 2011

(30) Foreign Application Priority Data
Feb. 25, 2009  (DE) .......................... 10 2009 001 133

(51) Int. Cl.
*G01L 9/00*   (2006.01)
(52) U.S. Cl.
USPC ............................................................ 73/74
(58) Field of Classification Search
USPC .................................................... 73/700–756
See application file for complete search history.

(56) References Cited

U.S. PATENT DOCUMENTS

| 4,502,335 A | 3/1985 | Wamstad |
|---|---|---|
| 4,771,639 A | 9/1988 | Saigusa |

(Continued)

FOREIGN PATENT DOCUMENTS

| DE | 195 32 654 C1 | 3/1997 |
|---|---|---|
| DE | 102 31 010 A1 | 1/2004 |
| DE | 10 2004 053 672 A1 | 5/2006 |
| DE | 10 2005 002 658 A1 | 7/2006 |
| DE | 10 2006 040 545 A1 | 3/2008 |

OTHER PUBLICATIONS

English translation of the International Preliminary Examination Report.

*Primary Examiner* — Andre Allen
(74) *Attorney, Agent, or Firm* — Bacon & Thomas, PLLC

(57) ABSTRACT

A pressure sensor, comprising: a semiconductor pressure measuring transducer having a measuring membrane and a circuit for transducing a deformation of the measuring membrane into a signal; a pressure transfer structure having a hydraulic path, which extends through a solid body between a first a second opening. The first opening is sealed by an isolating diaphragm, which is contactable with a pressure, in order to introduce the pressure to be measured into the hydraulic path. The hydraulic path opens, at the second opening, into a transducer chamber, in which the pressure measuring transducer is arranged and which is sealed by the measuring membrane of the pressure measuring transducer. The hydraulic path contains a transfer liquid; a filling element, which is arranged in the transducer chamber, in order to fill hollow spaces between metal walls of the transducer chamber and the semiconductor pressure measuring transducer. An insulator plate, which is arranged in the transducer chamber between the measuring membrane and a wall of the transducer chamber lying opposite the measuring membrane; wherein the insulator plate is affixed to the filling element or is embodied as one piece with the filling element.

10 Claims, 2 Drawing Sheets

(56) References Cited

U.S. PATENT DOCUMENTS

| | | | | |
|---|---|---|---|---|
| 6,487,912 B1* | 12/2002 | Behm et al. | | 73/753 |
| 8,276,457 B2* | 10/2012 | Philipps | | 73/716 |
| 2006/0048580 A1 | 3/2006 | Vogler | | |
| 2011/0113889 A1* | 5/2011 | Funken et al. | | 73/715 |
| 2011/0209552 A1* | 9/2011 | Tham et al. | | 73/702 |
| 2012/0017690 A1* | 1/2012 | Philipps | | 73/724 |
| 2012/0137784 A1* | 6/2012 | Krusemark et al. | | 73/724 |
| 2013/0008256 A1* | 1/2013 | Rossberg et al. | | 73/724 |

* cited by examiner

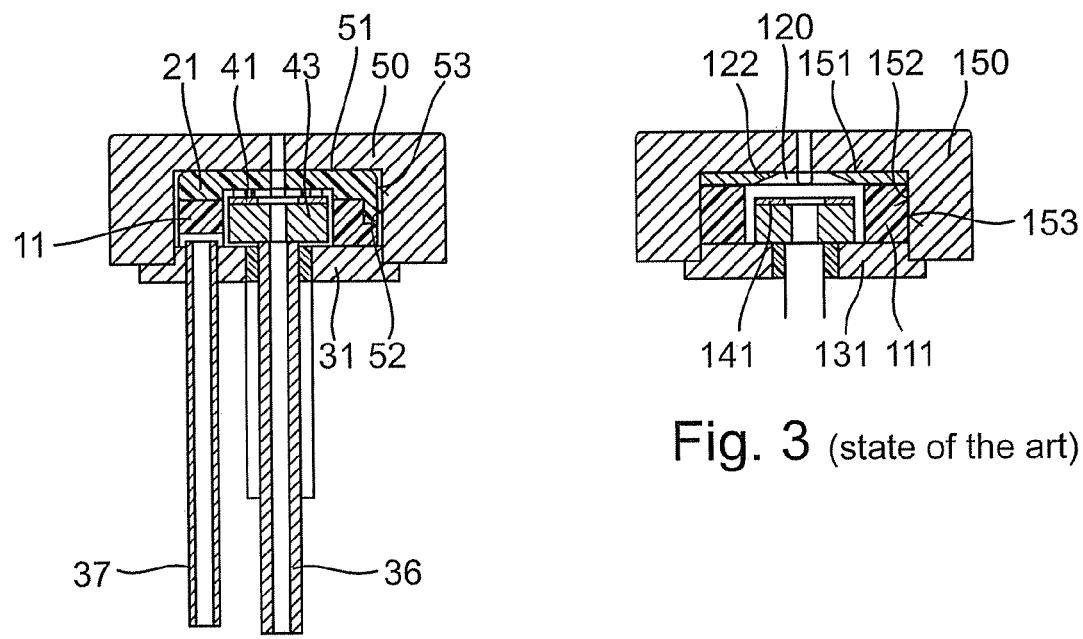
Fig. 2
Fig. 3 (state of the art)
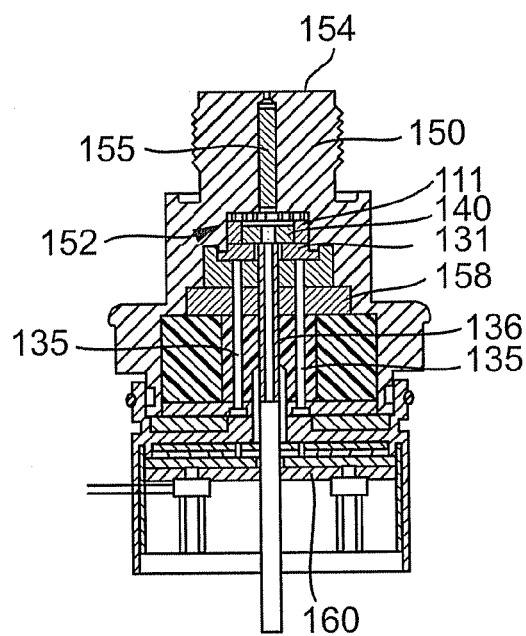
Fig. 4 (state of the art)

PRESSURE SENSOR WITH SEMICONDUCTOR PRESSURE MEASURING TRANSDUCER

TECHNICAL FIELD

The present invention relates to a pressure sensor, especially a pressure sensor having a semiconductor pressure measuring transducer.

BACKGROUND DISCUSSION

Such a pressure measuring transducer comprises a measuring membrane and a circuit for transducing a pressure dependent deformation of the measuring membrane to an electrical signal. The circuit can comprise, for example, a (piezo-) resistive bridge circuit or a capacitive circuit having at least two electrodes, wherein the measuring membrane has at least one resistor of the bridge circuit or one of the electrodes. In process measurements technology, a semiconductor pressure measuring transducer is usually supplied with a process pressure to be measured via a pressure transfer means, since available semiconductor materials are scarcely able directly to withstand the varied media and process conditions of the process industry. A pressure transfer means comprises a hydraulic path, which extends through a solid body, usually of metal, between a first opening and a second opening; wherein the first opening is sealed by an isolating diaphragm, which is contactable with a pressure to be measured, in order to introduce the pressure to be measured into the hydraulic path; wherein the hydraulic path opens into a transducer chamber at the second opening. The pressure measuring transducer is arranged in the transducer chamber. The transducer chamber is sealed by the measuring membrane of the pressure measuring transducer. The hydraulic path contains a transfer liquid for the transfer of pressure. This transfer liquid has a coefficient of thermal expansion that is significantly greater than the coefficient of thermal expansion of the surrounding solid body. This causes temperature dependent deflections of the isolating diaphragm and brings about a corruption of the pressure introduced into the hydraulic path due to the not insignificant stiffness of the isolating diaphragm. Consequently it is advantageous to minimize the volume of the hydraulic path and, respectively, the transfer liquid, for which purpose, for example, filling elements are brought into the transducer chamber, in order to fill manufacturing related hollow spaces between the metal walls of the transducer chamber and the semiconductor pressure measuring transducer. Especially when manufactured of plastic in the form of injection molded parts, the filling elements can be fitted as accurately as desired to the contours of the hollow spaces to be filled. A pressure sensor with such a filling element for filling the hollow space between the cylindrical lateral surface of a transducer chamber wall and the semiconductor transducer is sold by the assignee under the name Cerabar M.

Insofar as the transducer chamber is formed in a metal material, Cerabar M additionally has an insulator plate made of synthetic material arranged in the transducer chamber. The insulator plate is biased against the filling element by a spring, which is supported on an end of the transducer chamber wall, in order, on the one hand, to insulate the measuring membrane from the metal wall and, on the other hand, to hold the filling element and the insulator plate in position.

Assembly of the filling element, the insulator plate, and the spring requires a large manual effort. Additionally, the volume taken up by the spring and required for the working stroke of the spring cannot be directly limited with a filling element. Thus, there are limits here as to how much the volume of the transfer liquid can be minimized.

SUMMARY OF THE INVENTION

It is, consequently, an object of the present invention to provide a pressure sensor, which overcomes the above related disadvantages of the state of the art.

The object is achieved according to the invention by a semiconductor pressure measuring transducer having a measuring membrane and a circuit for transducing a pressure dependent deformation of the measuring membrane into an electrical signal; a pressure transfer means having a hydraulic path, which extends through a solid body between a first opening and a second opening; wherein the first opening is sealed by an isolating diaphragm, which is contactable with a pressure to be measured, in order to introduce the pressure to be measured into the hydraulic path; wherein the hydraulic path opens, at the second opening, into a transducer chamber, in which the pressure measuring transducer is arranged and which is sealed by the measuring membrane of the pressure measuring transducer; wherein the hydraulic path contains a transfer liquid; a filling element, which is arranged in the transducer chamber, in order to fill hollow spaces between metal walls of the transducer chamber and the semiconductor pressure measuring transducer; and an insulator plate, which is arranged in the transducer chamber between the measuring membrane and a wall of the transducer chamber lying opposite the measuring membrane; characterized in that the insulator plate is affixed to the filling element or is embodied as one piece with the filling element.

In a further development of the invention, the filling element and a wall of the transducer chamber have mutually compatible securement means, which are engaged with one another, for example, plug and bores, engaging lugs and stop surfaces suitable thereto, in order to secure the filling element to the wall of the transducer chamber in a clamped and/or shape interlocked manner. The filling element can equally, or supplementally, be adhered to the wall of the transducer chamber.

In a further development of the invention, the filling element and the insulator have mutually complementary securement means, which are engaged with one another, for example, plug and bores, engaging lugs and stop surfaces suitable thereto, in order to secure the insulator plate to the filling element in a clamped and/or shape interlocked manner. The insulator plate can equally, or supplementally, be adhered or welded to the filling element. Especially ultrasonic welding is suitable for welding plastic filling elements and insulator plates.

In a further development, the insulator plate has a sufficiently planar and smooth area suitable to permit transport of the insulator plate and, in given cases, the filling element connected to the insulator plate, by means of a suction tool. Therefore, assembly of the insulator plate and filling element can be done automatically, for example by means of a robot.

In a further development of the invention, the insulator plate has an essentially planar surface, which lies opposite a section of a wall of the transducer chamber extending essentially parallel thereto, wherein the distance between the section of the wall of the transducer chamber and the surface of the insulator plate is less than 20%, preferably less than 10%, further preferably less than 5% and especially preferably less than 2.5% of the longest extent of the surface of the insulator plate.

In a further development, the filling element and the wall of the transducer chamber have an essentially cylindrical, or frustoconically shaped, contour, wherein an annular gap remains between the surface of the filling element and the wall of the transducer chamber. The volume of the annular gap is less than 50%, preferably less than 25%, further preferably less than 20% and especially preferably less than 10% of the volume of the filling element, including the insulator plate.

In a further development of the invention, the transducer chamber has at least a first wall assembly and a second wall assembly; wherein the semiconductor pressure measuring transducer is mounted first on the first wall assembly; wherein the filling element, in a currently preferred embodiment of this further development of the invention, is likewise mounted on the first wall assembly, before the first wall assembly is connected pressure tightly to the second wall assembly, in order to seal the transducer chamber pressure tightly.

The first wall assembly can comprise, for example, an essentially metal platform, on whose surface the semiconductor pressure measuring transducer, the filling element and, in given cases, the insulator plate can be mounted.

Of course, it is also possible to mount the insulator plate and, in given cases, the filling element on the second wall assembly, before the first wall assembly is connected pressure tightly to the second wall assembly, in order to seal the transducer chamber pressure tightly.

The platform can comprise, for example, a so called TO8 mount, as used with the Cerabar pressure sensors of the prior art.

BRIEF DESCRIPTION OF THE DRAWINGS

The invention will now be explained based on an example of an embodiment illustrated in the drawings, the figures of which show as follows:

FIG. 2: is a schematic, longitudinal section through the transducer chamber with a mounted semiconductor pressure measuring transducer and a filling element with insulator plate in the case of a pressure sensor of the invention;

FIG. 3: is a schematic longitudinal section through the transducer chamber with a mounted semiconductor pressure measuring transducer and a filling element with insulator plate in the case of a pressure sensor according to the state of the art; and FIG. 4: is a longitudinal section through a pressure sensor according to the state of the art.

DETAILED DISCUSSION IN CONJUNCTION WITH THE DRAWINGS

Figure 1A:
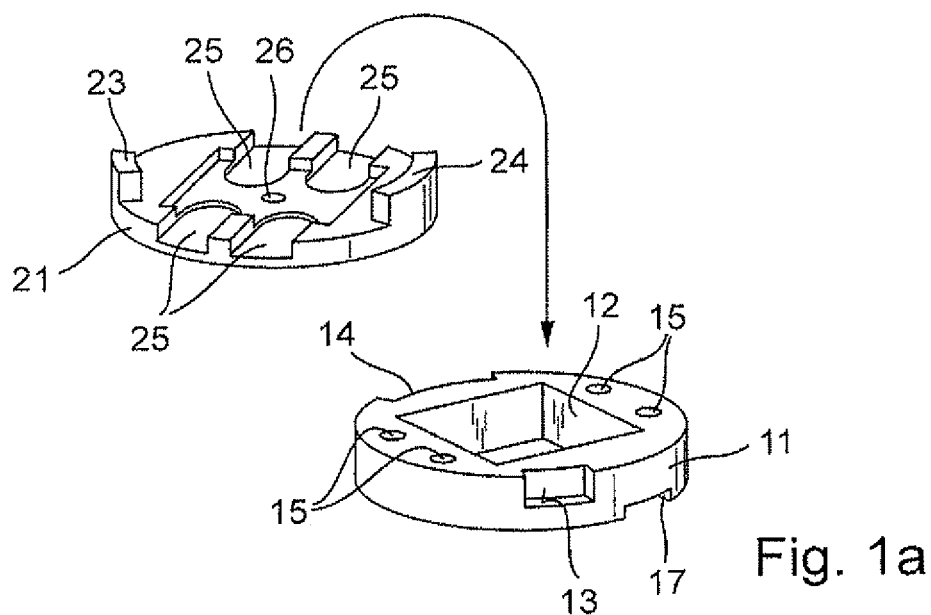
FIG. 1a: is a detail view of a filling element and an insulator plate of a pressure sensor of the invention according to a currently preferred embodiment of the invention.

The filling element 11 shown in FIG. 1 has an essentially cylindrical, basic form, wherein a window 12, especially a square window 12, is present in its interior. A semiconductor pressure measuring transducer can be accommodated in the square window 12. The contour of the window is, in such a case, to match the contour of the semiconductor pressure measuring transducer in such a manner that a gap remains between the semiconductor pressure measuring transducer and the filling element. On the one hand, the gap avoids contact of the components and enables a complete wetting of the surfaces of the semiconductor pressure measuring transducer with the transfer liquid and, on the other hand, the gap is embodied to be as narrow as possible (while still achieving the conditions of the one hand), in order to minimize the volume of the transfer liquid.

The filling element has on its upper side along its periphery a first cavity 13 and a second cavity 14, which serve to accommodate complementary first and second axial projections of the insulator plate.

In the illustrated embodiment of the invention, the end face of the filling element has a sufficiently large, smooth surface, by means of which the filling element can be raised and transported using a suction tool.

Extending from the end face of the filling element, through the filling element, are four axial bores 15, through which electrical connections for the semiconductor pressure measuring transducer can be led.

Furthermore, on the underside of the periphery of the filling element 11, there is a cavity 17, which serves as an exit for transfer liquid when filling the semiconductor transducer chamber.

A circular disk shaped insulator plate 21 is presented in FIG. 1a with its underside facing up. Plate 21 has a first axial protrusion 23 and a second axial protrusion 24 along its periphery, wherein both axial protrusions are provided to fit shape interlockingly into the two cavities along the periphery on the upper side of the filling element. Insofar as the protrusions and, respectively, the cavities, in each case, differ from one another in their sizes, and, respectively, are not distributed rotationally symmetrically relative to the cylindrical axis of the filling element, the orientation of the insulator plate relative to the lid is uniquely established by the protrusions. The insulator plate 21 has four cavities 25 on its underside. These cavities are provided to give space for connection wires for contacting the semiconductor pressure measuring transducer. In the center of the insulator plate 21 is an axial bore 26. It serves as a duct aligned with the center of a measuring membrane of the semiconductor pressure measuring transducer for the transfer liquid. This duct improves the dynamic response of the pressure sensor, but is, however, not absolutely required.

In FIG. 1 b, a first wall assembly is presented, which includes a platform 31, on which the semiconductor pressure measuring transducer 41 is secured with a pressure bearing connection, the details of which do not matter here. The filling element 11, which can, for example, be adhered to the platform 31, is shown surrounding the semiconductor pressure measuring transducer 41. The platform 31 includes a pedestal 33, beyond which an annular weld edge 32 protrudes radially outwards. Along this weld edge 32, the platform can be welded with a member of the second wall assembly, in order to close the transducer chamber. Four electrical feed-throughs 35, which align with the bores 15 through the filling element 11, extend in an axial direction through the pedestal 33 of the platform 31; wherein the feed-throughs 35 include contact pins, which preferably extend in an axial direction, for instance, up to the surface of the filling element 11. Equally, the surface of the semiconductor pressure measuring transducer 41 aligns, for instance, with the surface of the filling element 11. Thus, contact surfaces on the surface of the semiconductor pressure measuring transducer 41 can be connected via bond wires 45 to the contact pins by means of an automated assembly robot. The electrical feed-throughs 35 extend far on the underside of the platform from the platform, so that they can penetrate a potting compound, which covers the underside of the platform after a later assembly step.

Furthermore, a reference air tube 36 extends through the pedestal 33. For instance, the reference air tube extends in an axial direction through the center of the pedestal, in order to supply atmospheric pressure to the rear side of the measuring membrane of the semiconductor pressure measuring transducer 41.

Furthermore, a filling tube 37 extends through the pedestal 33. The filling tube ends under the cavity 17 of the filling element, and through this filling tube the transducer chamber can be filled with a transfer liquid and, respectively, is filled with a transfer liquid in the manufactured pressure sensor.

Figure 1B:
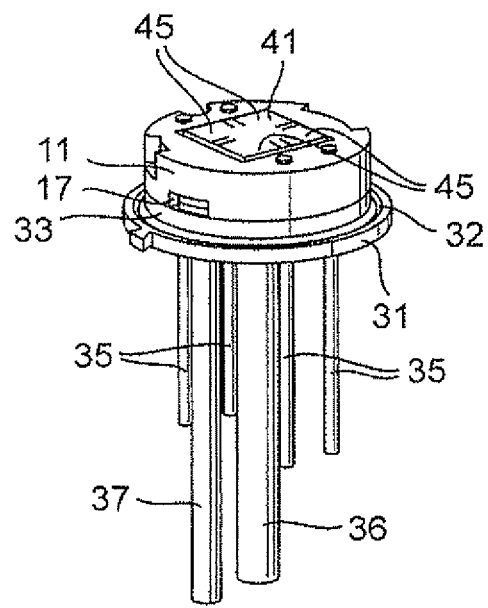
FIG. 1 b: is a 3 dimensional representation of a filling element arranged the around the semiconductor pressure measuring transducer of a pressure sensor of the invention.
FIG. 1c: is a 3 dimensional representation of an insulator plate, which is mounted on the filling element of the arrangement of FIG. 1b.
Figure 1C:
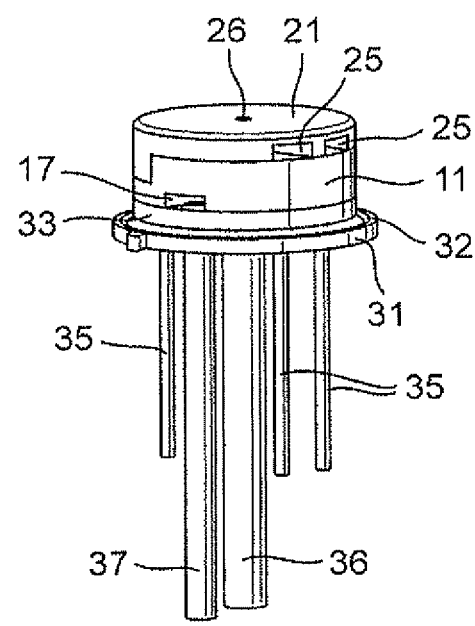

FIG. 1c shows the next assembly step for the components of FIG. 1b, wherein supplementally the insulator plate 21 is superimposed on the filling element 11. The lateral cavities 25 on the underside of the insulator plate provide, on the one hand, the required space for the bond wires for contacting the semiconductor pressure measuring transducer 41, and, on the other hand, serve as passageways for the transfer liquid.

The sectional drawing in FIG. 2 shows the next assembly step for manufacturing the pressure sensor. A second wall assembly 50, which is simplified in this presentation here, has a chamber bore 52, into which the parts mounted on the platform 31, thus the filling element 11, the insulator plate 21, and the semiconductor pressure measuring transducer 41 seen here with a glass or semiconductor base 43 under the piezo resistive transducer element, are pushed in; wherein the platform is welded pressure tightly along its weld edge to the second wall assembly. The chamber bore has, in such case, an inner diameter which is only insignificantly greater than the outer diameter of the filling element so that the volume of the annular gap 53 between the filling element 11 or the insulator plate 21 and the wall of the chamber bore 52 is significantly smaller than the volume of the cylindrical envelope of the filling element with the insulator plate attached. Thus, the annular gap in the illustrated form of embodiment has a volume which is less than 5% of the volume of the envelope of the filling element 11 with the insulator plate 21 attached. Correspondingly, the distance between the end face of the insulator plate 11 and the opposite end face of the bore 52 is less than 5% of the height of the enveloping cylinder of the filling element and insulator plate. In other terms, the width of the annular gap is, for example, no greater than 0.2 mm, preferably no greater than 0.15 mm and especially preferably no greater than 0.125 mm.

Through the exact orientation of the insulator plate relative to the filling element, also the space for the bond wires for contacting the semiconductor pressure measuring transducer can be provided by cavities of minimum volume. When no space is required, the insulator plate can be solid, as is evident from FIG. 1a, as is noted here briefly again.

As can be seen in FIG. 2, a duct opens into the end of the chamber bore. The semiconductor pressure measuring transducer in the transducer chamber is contactable with a media pressure to be measured by means of a transfer liquid via this duct. In such a case, the media pressure acts on the front surface (the surface facing the duct) of the measuring membrane of the semiconductor pressure measuring transducer 41, while the rear surface of the measuring membrane is contactable with atmospheric pressure via the reference air duct 36. This example of an embodiment clearly relates to a relative pressure sensor. Of course, the invention can also apply to absolute pressure sensors, in which the rear side of the measuring membrane encloses an evacuated space. In this case, then, no reference air path is present.

The material of the filling element 21 and the insulator plate 21 comprises, for example, a temperature resistant plastic, for example, PPS, which is chemically inert relative to the transfer liquid.

The semiconductor pressure measuring transducer 41 comprises, for example, a resistance bridge circuit, whose resistance elements comprise specially doped semiconductor regions of the measuring membrane. The semiconductor pressure measuring transducer can equally comprise a capacitive transducer circuit, wherein, for this, the measuring membrane has at least one electrode, which is deflectable relative to a counterelectrode as a function of pressure. The present invention does not depend on the details regarding the transducer principle, and consequently these do not need to be explained here in greater detail.

The minimization of the volume of the transfer liquid achieved by the invention will become clearly evident through a comparison of FIG. 2 with FIG. 3, which shows a transducer chamber according to the state of the art.

In the case of the illustrated transducer chamber according to the state of the art, an insulator plate 120 is held against a filling element 111 by means of a spring 122. The filling element 111 is arranged on a platform 131 around a semiconductor pressure measuring transducer 141. The platform 131 is welded along its edge to a second wall assembly 150. The second wall assembly 150 has a chamber bore 152, wherein an annular gap 153 between the cylindrical wall of the chamber bore and the lateral surface of the filling element can similarly be as narrow as in the construction corresponding to the invention. In this regard, the invention thus offers no improvement, for this more concerns the end of the chamber. Since the insulator plate 120 is prestressed against the filling element 111 by means of a spring 122, at least the volume for the spring stroke must remain free, and be filled with oil in measurement operation.

According to the invention, by affixing the insulator plate to the filling element and the associated elimination of the spring, the volume otherwise required can be reduced significantly.

Furthermore, the insulator plate 120 is embodied completely planarly on its underside facing the semiconductor pressure measuring transducer. This is required, since the insulator plate has no set orientation relative to the semiconductor pressure measuring transducer 120, and in this regard, sufficient space must be left for connection wires for the semiconductor pressure measuring transducer 120 in each orientation. Therewith, there remains, even in the space surrounded by the filling element, a great amount of empty volume, which is filled with transfer liquid in measurement operation.

According to the invention, the empty volume can be significantly reduced further by the unique orientation of the insulator plate relative to the filling element and the then possible small volume cavities for the connection wires.

FIG. 4 shows a longitudinal section through a relative pressure sensor according to the state of the art, wherein a relative pressure sensor according to the invention is identical to a relative pressure sensor according to the state of the art except for the embodiment of the filling element and the insulator plate thoroughly discussed earlier. In order to manufacture a relative pressure sensor of the invention, only the named parts are to be substituted with the parts of the invention during manufacture.

The relative pressure sensor comprises a semiconductor pressure measuring transducer 140 on a platform 131 with a filling element 111 and an insulator plate, which is biased against the filling element by a spring. Platform 131 is welded to a sectionally cylindrical, housing body 150, wherein the semiconductor pressure measuring transducer 140, the filling element 111, the insulator plate and the spring are arranged in a chamber bore 152 in the interior of the housing body 150.

A hydraulic path 155, which here contains a filler for providing a flameproof barrier, extends from a first end face 154 of the housing body 150, on whose edge an isolating diaphragm is welded pressure tightly, to an opening in the end face of the bore 152, in order to supply a media pressure to the semiconductor pressure measuring transducer. The housing body 150 has a rear opening, to which a reference air duct 136 is led from the rear of the measuring membrane of the semiconductor pressure measuring transducer 140. Electrical feed-throughs 135, which are connected to resistance elements of the measuring membrane on the front via connection wires, are led on the rear to an electrical circuit 160, which is arranged in the interior of the housing body 150. The inner space of the housing body 150 on the rear side of the platform 131 is filled with a potting compound 158, which covers the electrical circuit 160.

The invention claimed is:

1. A pressure sensor, comprising:
a semiconductor pressure measuring transducer having a measuring membrane and a circuit for transducing a pressure dependent deformation of said measuring membrane into an electrical signal;
a pressure transfer means having a hydraulic path, which extends through a solid body between a first opening and a second opening, wherein the first opening is sealed by an isolating diaphragm, which is contactable with a pressure to be measured, in order to introduce the pressure to be measured into the hydraulic path, wherein the hydraulic path opens, at the second opening, into a transducer chamber, in which said pressure measuring transducer is arranged and which is sealed by said measuring membrane of said pressure measuring transducer, wherein the hydraulic path contains a transfer liquid;
a filling element, which is arranged in said transducer chamber, in order to fill hollow spaces between metal walls of said transducer chamber and said semiconductor pressure measuring transducer; and
an insulator plate, which is arranged in said transducer chamber between said measuring membrane and a wall of the transducer chamber lying opposite said measuring membrane, wherein:
said insulator plate is affixed to said filling element or is embodied as one piece with said filling element.

2. The pressure sensor as claimed in claim 1, wherein:
said filling element and a wall of said transducer chamber have mutually compatible securement means, which are engaged located with one another, in order to secure said filling element to said wall of said transducer chamber in a clamped and/or shape interlocked manner.

3. The pressure sensor as claimed in claim 1, wherein:
said filling element is adhered to a wall of said transducer chamber.

4. The pressure sensor as claimed in claim 1, wherein:
said filling element and said insulator plate have mutually complementary securement means, which are engaged with one another, in order to secure said insulator plate to said filling element in a clamped and/or shape interlocked manner.

5. The pressure sensor as claimed in claim 1, wherein:
said insulator plate is adhered or welded to said filling element.

6. The pressure sensor as claimed in claim 1, wherein:
said insulator plate has a planar and smooth area, which is suitable to permit transport of said insulator plate and, in given cases, said filling element connected to said insulator plate, by means of a suction tool.

7. The pressure sensor as claimed in claim 1, wherein:
said insulator plate has an essentially planar surface, which lies opposite a section of a wall of said transducer chamber extending essentially parallel thereto; and
the distance between the section of the wall of said transducer chamber and said surface of said insulator plate is less than 20%, preferably less than 10%, further preferably less than 5% and especially preferably less than 2.5% of the longest extent of the surface of said insulator plate.

8. The pressure sensor as claimed in claim 1, wherein:
said filling element and the wall of said transducer chamber each have an essentially cylindrical, or frustoconically shaped, contour;
an annular gap remains between the lateral surface of said filling element and the wall of said transducer chamber; and
the volume of said annular gap is less than 50%, preferably less than 25%, further preferably less than 20% and especially preferably less than 10% of the volume of said filling element, including said insulator plate.

9. The pressure sensor as claimed in claim 1, wherein:
said transducer chamber has at least a first wall assembly and a second wall assembly;
said semiconductor pressure measuring transducer is mounted first on said first wall assembly; and
said filling element, in a currently preferred embodiment, is likewise mounted on said first wall assembly, before said first wall assembly is connected pressure tightly to said second wall assembly, in order to seal said transducer chamber pressure tightly.

10. The pressure sensor as claimed in claim 1, wherein:
said first wall assembly essentially comprises a metal platform, on whose surface said semiconductor pressure measuring transducer, said filling element and, in given cases, said insulator plate are mounted.

* * * * *